United States Patent [19]

Roberge

[11] 4,121,763
[45] Oct. 24, 1978

[54] FLUID TEMPERATURE TRANSDUCER

[75] Inventor: Frank L. Roberge, Scottsdale, Ariz.

[73] Assignee: The Garrett Corporation, Los Angeles, Calif.

[21] Appl. No.: 813,606

[22] Filed: Jul. 7, 1977

[51] Int. Cl.² .................. G05D 23/10; G01K 5/58
[52] U.S. Cl. ........................ 236/87; 73/349; 73/362.1; 73/362.4; 236/101 E
[58] Field of Search .......... 73/349, 362.1, 362.4; 236/87, 101 C, 101 E

[56] References Cited
U.S. PATENT DOCUMENTS

| 1,131,444 | 3/1915 | Tyson | 73/362.1 X |
| 1,222,870 | 4/1917 | Rany | 73/362.4 X |
| 2,161,679 | 6/1939 | Kuenhold | 236/87 X |
| 2,754,661 | 7/1956 | Coyne | 73/362.4 X |
| 3,201,042 | 8/1965 | Norman et al. | 236/87 X |
| 3,361,349 | 1/1968 | Alberani | 236/87 |

Primary Examiner—Charles Gorenstein
Attorney, Agent, or Firm—Orville R. Seidner; James W. McFarland; Albert J. Miller

[57] ABSTRACT

A fluid temperature transducer comprises a housing having two housing members, one of which defines a passageway controlled by a valve therein and the other is provided with a bimetallic disc subject on both faces to a fluid whose temperature is to be sensed, and arranged to engage actuating means for actuation of the valve when the temperature of the fluid sensed by the bimetallic disc changes between the crack point and set point temperatures.

14 Claims, 2 Drawing Figures

FLUID TEMPERATURE TRANSDUCER

BACKGROUND OF THE INVENTION (1) Field of the Invention

This invention pertains generally to fluid temperature transducers, and is more particularly concerned with transducers utilized for limiting the temperature of a fluid flowing through a duct.

(2) Description of the Prior Art

Typical of the prior art is a transducer arrangement employing a bimetallic disc supported at its edge and having a needle valve extending from a plug secured at the center of the disc. A needle valve is cooperatively disposed vis-a-vis a vent orifice formed in the housing and communicating with a source of fluid whose pressure is to be controlled by the positioning of the needle valve in accordance with the temperature of a sensed fluid in contact with one face of the bimetallic disc.

In order to minimize (to the extent possible) the effect of the pressure of the sensed fluid on the bimetallic disc, the disc is mounted in a cup-like container so that the bimetallic disc senses fluid temperature in the space defined by the disc and the container. The cup-like container is provided with a small bleed aperture which permits a bleed of the sensed fluid to flow across one face of the bimetallic disc and thereafter be vented. The claim is made that the bleed aperture is so small as to have little, if any, effect upon the pressure of the sensed fluid.

It will be noted that the bimetallic disc and needle valve assembly requires a shroud to shield the other face of the bimetallic disc against the influence of the temperature of the fluid vented by the needle valve.

It will be obvious to those skilled in the art that such a transducer is unnecessarily complex, lacking in rapid and accurate response to the temperature of the sensed fluid, and is comprised of a multiplicity of parts which tends to degrade the reliability of the device.

It was considered that transducers of the prior art, such as that briefly mentioned above, could be materially improved if the pressurized fluid to be controlled was caused to flow through a passageway having a poppet valve and valve seat means spaced from and disassociated from the general location of the bimetallic disc and the fluid sensed by it. The novel concept was that the poppet valve would have a stem of small section, extending through a guide bore in the main housing member, with the distal end of the stem projecting toward the center of a bimetallic disc secured at its peripheral edge in an open cage-like housing member disposed in the stream of fluid whose temperature was to be sensed by the disc.

It was contemplated in the concept that the cage-like housing member would be threadably coupled to the main housing member with the disc spaced from and coaxially disposed relative to the valve stem so that the crack point temperature, at which the disc would contact the distal stem end, could be adjusted. With an arrangement of this type the fluid whose temperature was to be sensed by the bimetallic disc would have free flow contact with both faces of the disc without materially disturbing or impeding the flow of the sensed fluid. Hence the disc could provide rapid response to temperature changes of the sensed fluid with excellent accuracy since there would be no heat transfer from the sensed fluid to the ambient through a complicated array of mechanical components disposed in the sensed fluid flow path.

A natural consequence of this novel concept was a reduction in the number of parts (and hence of maintenance requirements) with a concomitant increase of reliability. The present invention was conceived on this novel concept.

SUMMARY OF THE INVENTION

Accordingly, the invention has for its principal object the improvement of fluid temperature transducers having a controlled fluid passageway provided with valve means arranged to be actuated at a crack point temperature by a fluid temperature sensitive member in contact with a fluid whose temperature is to be sensed thereby. A particular object is to provide a transducer as aforesaid in the statement of the principal object, in which the valve means and the passageway controlled thereby are isolated from the fluid temperature sensitive member and the fluid sensed thereby.

It is a further object to provide a fluid temperature transducer as aforesaid in the statement of the particular object in which the valve means comprises a poppet valve cooperatively disposed with a valve seat formed in the controlled fluid passageway, the poppet valve having a stem guidingly disposed through a wall of the housing defining the passageway, and with an end of the stem arranged to be contacted by the fluid temperature sensitive member as the temperature of the fluid sensed thereby attains to a crack point.

It is another particular object to provide a transducer as aforesaid in the statement of the principal object, in which the fluid temperature sensitive member comprises a bimetallic disc secured at its peripheral edge with the central portion adapted to flex freely with variations of the temperature of the sensed fluid contacting the faces of the disc, and thereby actuate said valve means as the sensed fluid temperature changes between a crack point and a set point.

It is another further object to provide a fluid temperature transducer as aforesaid in the statement of the another particular object, in which the controlled fluid passageway is defined by a first housing member and the bimetallic disc is disposed on a second housing member having a cage-like configuration adapted to be adjustably disposed relative to the first housing member for adjustment of the crack point temperature of the sensed fluid at which the disc actuates the valve means.

It is an important object of the invention to provide a fluid temperature transducer of a minimum number of parts to enhance reliability and reduce maintenance requirements, and thereby to provide the lightest possible transducer which can be fabricated at lower cost than transducers of the prior art. It is another important object to provide a transducer of excellent accuracy and rapid response to changes of the temperature of the fluid sensed by the fluid temperature sensitive member. It is an equally important object to provide a transducer in which the sensing and controlling members are isolated from each other to the greatest extent possible in order that there be a minimum of heat transfer between the temperature sensing and fluid controlling members and between the sensed and controlled fluid.

Other and further objects will be apparent at once to those skilled in the art upon consideration of the drawing when considered in connection with the description thereof hereinbelow.

DESCRIPTION OF THE PREFERRED EMBODIMENT

Figure 1:
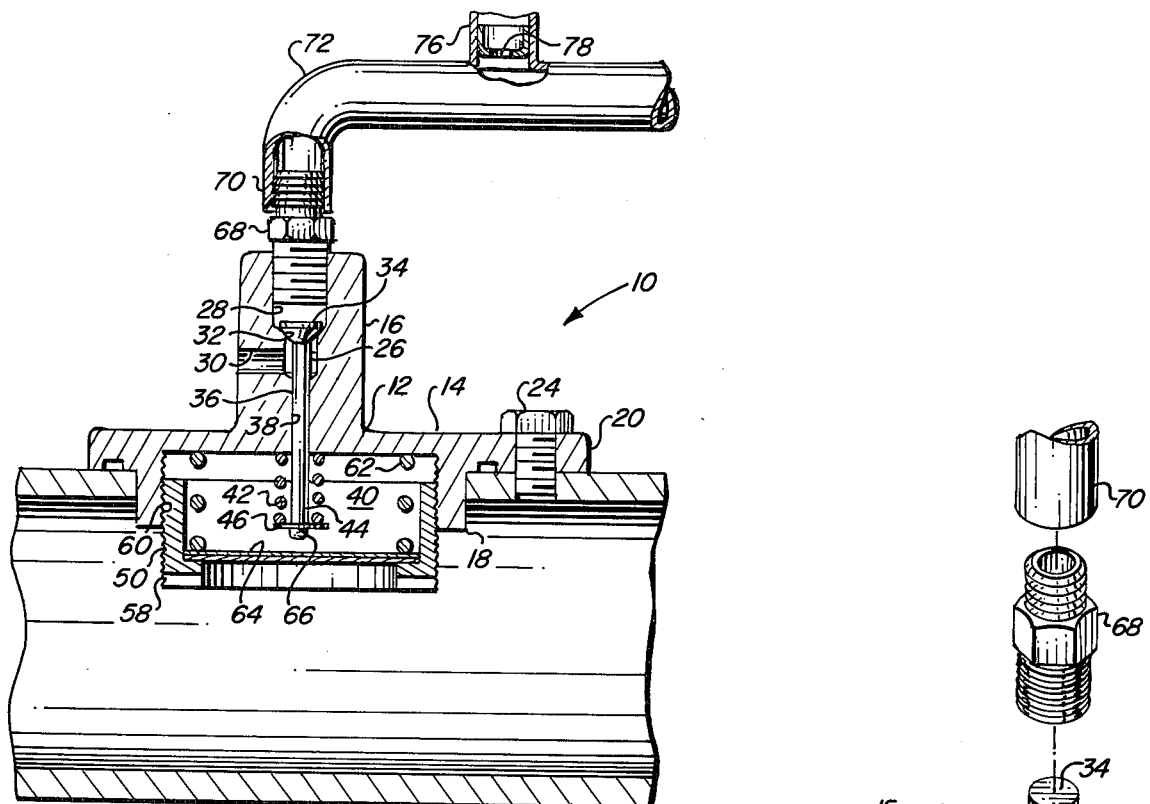
FIG. 1 is an illustration in cross section of a preferred form of the invention.

Referring to the drawing, there is depicted a fluid temperature transducer 10 having a first housing member 12 comprised of integral body portions 14, 16 and 18. Portion 14 is of generally flange-like configuration and is provided with a plurality of tab or ear elements 20 adapted to secure the transducer 10 in position on a duct 22, for example, by a plurality of bolts 24, one of which is shown on FIG. 1.

Figure 2:
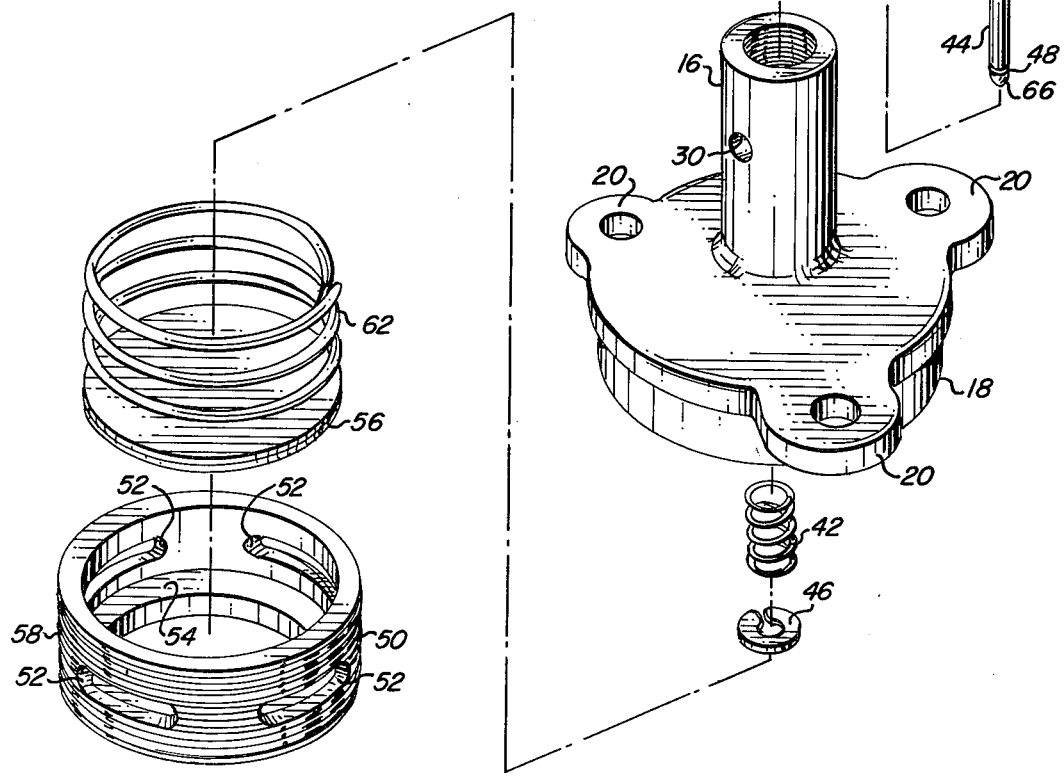
FIG. 2 is an exploded view of the transducer of FIG. 1.

The boss-like body portion 16 extends generally upwardly, as shown on the drawing, along and concentric about an axis which coincides with the broken line 15 of FIG. 2, and defining a passageway 26 having ports 28 and 30 at the ends thereof. Intermediate the ports 28 and 30, the passageway is formed as a valve seat 32 arranged to cooperate with a poppet valve 34 to control the flow of a controlled fluid between the ports 28 and 30, as will be explained hereinbelow. The valve 34 is provided with an elongate stem 36 which is guidingly disposed for movement along said axis in an elongate bore 38 defined by the body portions 14 and 16.

The housing body portion 18 extends from the lower face of the body portion 14 to form therewith a cup-like recess 40 into which the stem 36 extends. In the preferred embodiment, the valve 34 is urged into seating engagement with the seat 32 by a light compression spring 42 disposed about the lower end portion 44 of the stem 36 intermediate the lower face of the body portion 16 and a snap ring 46 removably snapped in a groove 48 in the stem 36, as best understood with reference to FIG. 2. The spring 42 also serves nominally to resist the effect of fluid pressure in the duct 22 on the stem 36.

The transducer 10 further comprises a second housing member 50 formed as a cage-like member having a plurality of openings 52. The member 50 is formed with an inturned lip 54 to receive and secure the peripheral edge of a fluid temperature sensitive member shown as a bimetallic disc 56.

The outer concentric surface of the member 50 is provided with male threads 58 adapted to be received in the female threads 60 formed on the inner concentric surface of the body portion 18 about the said axis of the stem 36. A compression spring 62 disposed between the disc 56 and the under surface of the body portion 14 serves to secure the disc 56 against movement away from the lip 54.

The threaded engagement between the housing member 12 and 50 provides a means of adjusting about the said stem axis the trip or crack point temperature, at which the center 64 of the disc 56 makes contact with the end 66 of the stem 36 by flexure of the disc upon variation of the temperature of the sensed fluid to which the disc 56 is subjected. The openings 52 in the cage-like housing member 50 permit free access of the sensed fluid to both faces of the disc 56, thereby insuring rapid response of the disc to fluid temperature variations. Furthermore, since the center 64 of the disc 56 flexes along the axis of the valve stem 36, the action of the disc 56 creates little or no binding problem for the stem 36 in its guideway bore 38, which can be thusly of minimum clearance to prevent the seepage or interchange between fluids in the passageway 26 and the duct 22.

Transducer 10 is favorably adapted to control of a flow of controlled fluid through the passageway 26. To this end the preferred embodiment utilizes the port 30 as a vent for fluid under controlled pressure present at the port 28. For this purpose the port 28 is threaded to receive a conduit fitting 68 upon which is threadably secured the end 70 of a conduit 72 whose distal end, generally designated by the reference numeral 74, may be connected to apparatus (not shown) whose function is to be controlled by the transducer 10, as will be described hereinbelow. A branch conduit 76 may be coupled to a fluid source (not shown) to provide a supply of controlled fluid to the conduit 72 via an orifice restriction 78.

OPERATION OF THE INVENTION

In a working embodiment of the invention having structure substantially as described above, the transducer is employed as a temperature limiting device for a fluid duct as employed in the cabin heating and ventilating system for an aircraft. As will be understood by those skilled in the art, such usage requires components having a high degree of reliability and accuracy, rapid response and low maintenance costs.

The aforesaid system is fully and adequately disclosed in a co-pending application Ser. No. 813,607 for Letters Patent, filed concurrently herewith, on a joint invention by B. Frank Saylor, David H. Holmgren, and Robert A. Null, entitled "Fluid Temperature Control System," and assigned to the same assignee as that of the present application. In that system hot and cold air sources are coupled through separate conduits or ducts to a common juncture point where mixing occurs, the mixed air then being conducted therefrom through a main supply duct to the cabin. The separate duct or conduit for the hot air is provided with simple butterfly valve means to control the flow of hot air to the mixing juncture, the valve means positioned by a control means having a movable wall means which responds to pressure in a controlled fluid conduit coupled thereto. As pressure in the control fluid conduit increases, the wall means responds by opening the valve means, and vice versa.

The main supply duct of the system has its counterpart in duct 22 disclosed herein, and the controlled fluid conduit of the system corresponds to the conduit 72 herein with the distal end 74 coupled directly to the aforesaid controlled fluid conduit. In the patent application on the system there is also disclosed additional mode and temperature selectors and temperature sensors not germane to the present application, and which will not be discussed herein since such discussion might tend to obscure the novelty of the transducer of this application.

It should be noted incidentally that the valve and valve control means of the aforesaid system application can be replaced by another form of fluid flow control as fully and adequately disclosed in another co-pending application Ser. No. 813,605 for letters patent, filed concurrently herewith, on a joint invention by Gary Frederick and Paul Mohr, entitled "Mixing Valve," and assigned to the same assignee as that of the present application.

Turning now to the present disclosure, the transducer 10 is arranged to bleed off the pressure in the conduit 72 and thus cause the butterfly or mixing valve (not shown) in the hot air duct (likewise not shown) to move toward a more closed position and reduce (or shut off entirely) the hot air supplied to the cabin. To this end the center 64 of the bimetallic disc 56 flexes upwardly with increasing temperature of the air in the duct 22, and makes contact with the end 66 of the valve stem 36 at the crack point limit of temperature predetermined by the screw thread adjustment of the cage housing member 50 relative to the main housing member 12.

With increasing temperature of the fluid in the duct 22, the disc 56 will flex still further upwardly to cause the poppet valve 34 to lift off the seat 32 and permit bleed of pressure from the conduit 72. The action is thus that of modulation of the bleed as temperature of the air in the duct 22 exceeds the crack point temperature. The modulation proceeds with both increasing and decreasing duct temperatures that are above the crack point. Of course, with decreasing duct air temperature the spring 42 causes the poppet valve to follow the disc as it becomes unflexed.

The action of the bimetallic disc is rapid since it is relatively thin and requires very little heat soak to cause it to flex by differential expansion of the metal laminates of which it is composed. Also, as will now be apparent to those skilled in the art, the rapid action is enhanced by the relatively free flow of duct air over both faces of the bimetallic disc. An additional feature is that the forcing action of the bimetallic disc is directed along the axis of the poppet valve stem, hence the friction of the stem in the elongate guide bore is at a minimum and very little resistance is offered to movement of the poppet valve by the bimetallic disc. Furthermore, the passageway bore 38 is of such comparative length that there is practically no loss of either controlled or sensed fluids therethrough from one end to the other. Also, the valve stem is of such modest cross section, the transducer is relatively insensitive to pressure changes in the duct 22.

As will now be evident to those skilled in the art, the objects of the invention have been met in a transducer that is constructed of relatively few low cost parts that are easily assembled into a reliable and rapidly acting transducer which will require a minimum of low cost maintenance. It will also be obvious to those skilled in the art that the invention suggests various modifications and arrangements of the elements comprising the basic apparatus described with reference to the embodiment of the disclosure, and that all such arrangements and modifications are contemplated within the spirit and substance of the claimed invention, limited only by a just interpretation of the prior art.

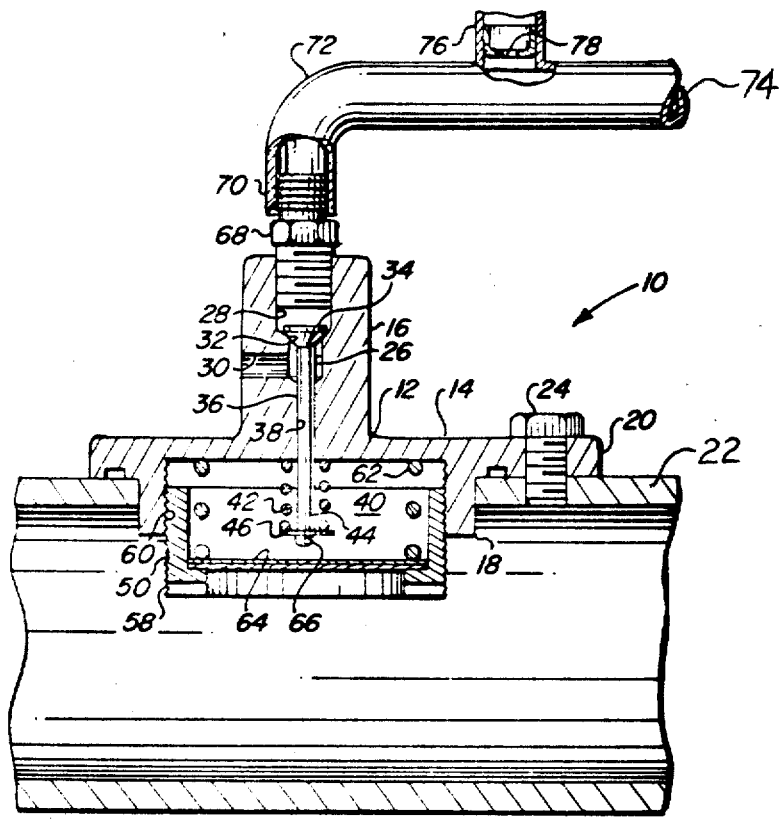

I claim:

1. A fluid temperature transducer, comprising:
   (a) a housing having first and second housing members,
      said first housing member defining a passageway,
      said second housing member disposed on said first member;
   (b) first and second valve elements cooperatively disposed in said passageway of said first member, one of said valve elements being movable with respect to the other for controlling the flow of a fluid through said passageway;
   (c) a fluid temperature sensitive member disposed on said second housing member; and
   (d) valve element actuating means disposed between said one of said valve elements and said fluid temperature sensitive member for actuation of said one of said valve elements when the temperature of the fluid sensed by said sensitive member changes between a crack point and a set point,
      said sensing means being spaced apart from said actuating means when said fluid temperature is outside the range between said crack point and set point,
   said second housing member adjustably disposed on said first housing member.

2. The transducer of claim 1, characterized in that said other of said valve elements is a valve seat formed in said passageway on said first housing member, said one of said valve elements is a poppet valve, and said valve element actuating means is a valve stem extending from said poppet valve through said first housing member with an outer end of said stem adjacent said fluid temperature sensitive member and adapted to be engaged thereby at said crack point temperature to thereby modulate the flow of fluid through said passageway as the temperature of the fluid sensed by said fluid temperature sensitive member changes further and continuously.

3. The transducer of claim 2, characterized in that said poppet valve is biased to seat on said seat to close off said passageway, and at said crack point temperature said fluid temperature sensitive member engages said outer end of said stem upon increasing temperature of the fluid sensed by said sensitive member, and with further temperature increase to thereafter modulate said poppet valve to a more open position to modulate fluid flow through said passageway.

4. The transducer of claim 1, characterized in that said fluid temperature sensitive member comprises a bimetallic element supported by said second housing member for flexure of said bimetallic element to and from said actuating means upon changes of the temperature of the fluid to which said bimetallic element is subjected.

5. The transducer of claim 4, characterized in that said bimetallic element is formed substantially as a circular disc supported at the peripheral edge thereof by said second housing member, and disc being adapted to engage said actuating means at substantially the center of said disc, said disc being subject on both faces thereof to the fluid being sensed.

6. The transducer of claim 5, characterized in that said second housing member is threadably disposed on said first member for adjustment of the crack point temperature at which said temperature sensitive member engages said valve element actuating means.

7. The transducer of claim 6, characterized in that said other of said valve elements is a valve seat formed in said passageway on said first housing member, said one of said valve elements is a poppet valve, and said valve element actuating means is a valve stem extending from said poppet valve through said first housing member with an outer end of said stem adjacent said bimetallic disc and adapted to be engaged thereby at said crack point temperature to thereby modulate the flow of fluid through said passageway as the temperature of the fluid sensed by said bimetallic disc changes further and continuously.

8. The transducer of claim 7, characterized in that said poppet valve is biased to seat on said valve seat to close off said passageway, and at said crack point temperature said bimetallic disc engages said outer end of said stem upon increasing temperature of the fluid sensed by said bimetallic disc, and with further temperature increase to thereafter modulate said poppet valve to a more open position to modulate the fluid flow through said passageway.

9. Apparatus for controlling the flow of a first fluid in accordance with the temperature of a second fluid, comprising:
   (a) apparatus housing means having a first housing member provided with a passageway for the flow of the first fluid, and a second housing member disposed adjacent said first housing member;
   (b) valve means disposed in said passageway for controlling the flow therethrough of the first fluid;
   (c) fluid temperature sensing means on said second housing member and disposed to sense the temperature of the second fluid; and
   (d) coupling means disposed between said valve means and said sensing means,
      said sensing means acting upon said coupling means and thereby upon said valve means to modulate the flow of the first fluid when the temperature of the second fluid varies between a crack point temperature and a set point temperature,
      said sensing means being otherwise spaced apart from said coupling means when the temperature of the second fluid is outside the range between said crack point and set point temperatures,
      said second housing member being adjustably disposed on said first housing member.

10. The apparatus of claim 9 in which:
    (a) said valve means comprises a poppet valve; and
    (b) said coupling means comprises a bore in one of said housing members and a valve stem slidable therewithin, one end of said valve stem having said poppet valve thereon and the other end disposed adjacent to but spaced from said sensing means when the temperature of the second fluid is below that of said crack point.

11. The apparatus of claim 10 in which:
    said fluid temperature sensing means comprises a bimetallic element having both faces subject to the flow thereacross of the second fluid.

12. Apparatus for controlling the flow of a first fluid in accordance with the temperature of a second fluid, comprising:
    apparatus housing means having a first housing member provided with a passageway for the flow of the first fluid, and a second housing member disposed adjacent said first housing member;
    valve means comprising a poppet valve disposed in said passageway for controlling the flow therethrough of the first fluid;
    fluid temperature sensing means on said second housing member and disposed to sense the temperature of the second fluid;
    coupling means disposed between said valve means and said sensing means, said sensing means acting upon said coupling means and thereby upon said valve means to modulate the flow of the first fluid when the temperature of the second fluid varies between a crack point temperature and a set point temperature, said sensing means being otherwise spaced apart from said coupling means when the temperature of the second fluid is outside the range between said crack point and set point temperatures,
    said coupling means comprising a bore in one of said housing members and a valve stem slidable therewithin, one end of said valve stem having said poppet valve thereon and the other end disposed adjacent to but spaced from said sensing means when the temperature of the second fluid is below that of said crack point,
    said sensing means comprising a bimetallic element having both faces subject to the flow thereacross of the second fluid,
    said bimetallic element comprising a disc whose peripheral edge is supported by said second housing member, and
    said second housing member being adjustably disposed on said first housing member.

13. Apparatus for controlling the flow of a first fluid in accordance with the temperature of a second fluid, comprising:
    (a) apparatus housing means;
    (b) valve means on said housing means for controlling the flow of the first fluid;
    (c) a temperature sensitive bimetallic element supported on said housing means so as to have both faces of said element subject to the flow of the second fluid,
       and to flex convexly on one face thereof with changing temperature of the second fluid; and
    (d) engaging means on said valve and arranged to be engaged by said element when the temperature of the second fluid attains a crack point and to be spaced apart from said element when said temperature of the second fluid is less than said crack point,
    said housing means comprising a substantially fixed first housing member and a second housing member adjustably disposed on said first housing member, said valve means disposed on said first member, and said bimetallic element supported by said second member.

14. The apparatus of claim 13 in which:
    said bimetallic element is formed as a disc supported at its periphery by said housing means whereby the center of said disc flexes substantially along a straight line with temperature changes of the second fluid,
    said center of said disc engaging said engaging means at said crack point temperature and thereafter moving said engaging means substantially along said straight line with further changes of temperature of the second fluid.

* * * * *

UNITED STATES PATENT AND TRADEMARK OFFICE
CERTIFICATE OF CORRECTION

PATENT NO. : 4,121,763　　　　　　　　　　Page 1 of 2
DATED : October 24, 1978
INVENTOR(S) : Frank L. Roberge It is certified that error appears in the above-identified patent and that said Letters Patent are hereby corrected as shown below:

On the title page, the illustrative figure and Fig. 1 of the drawing to appear as shown on the attached sheet.

Signed and Sealed this

Seventeenth Day of July 1979

[SEAL]

Attest:

LUTRELLE F. PARKER
Attesting Officer　　　Acting Commissioner of Patents and Trademarks